(12) United States Patent
Tapalian et al.

(10) Patent No.: US 6,934,436 B2
(45) Date of Patent: Aug. 23, 2005

(54) THERMO-OPTICAL SWITCH USING COATED MICROSPHERE RESONATORS

(75) Inventors: Haig Charles Tapalian, Canton, MA (US); Paul A. Lane, Roslindale, MA (US)

(73) Assignee: The Charles Stark Draper Laboratory, Inc., Cambridge, MA (US)

(*) Notice: Subject to any disclaimer, the term of this patent is extended or adjusted under 35 U.S.C. 154(b) by 158 days.

(21) Appl. No.: 10/279,689

(22) Filed: Oct. 24, 2002

(65) Prior Publication Data

US 2003/0152313 A1 Aug. 14, 2003

Related U.S. Application Data

(60) Provisional application No. 60/342,866, filed on Oct. 25, 2001.

(51) Int. Cl.[7] .............................. G02B 6/35; G02B 6/28
(52) U.S. Cl. .............................. 385/16; 385/24; 385/32
(58) Field of Search .............................. 385/16–24, 31, 385/32

(56) References Cited

U.S. PATENT DOCUMENTS

| 6,243,517 | B1 | 6/2001 | Deacon |
| 6,411,752 | B1 | 6/2002 | Little et al. |
| 6,701,033 | B2 * | 3/2004 | Okayama ..................... 385/16 |
| 2002/0025105 | A1 | 2/2002 | Okayama |

OTHER PUBLICATIONS

International Search Report PCT/US02/34040.

* cited by examiner

Primary Examiner—John R. Lee
Assistant Examiner—Paul M. Gurzo
(74) Attorney, Agent, or Firm—McDermott Will & Emery LLP

(57) ABSTRACT

An all-optical switch includes a microsphere optical resonator coated with a conjugated polymer. A signal light beam propagating along a first SPARROW waveguide defining a throughput channel is evanescently coupled into the resonant whispering gallery modes (WGM) of the microsphere, and out of the microsphere onto a second SPARROW waveguide defining a drop channel. A secondary switching light beam is used to heat the microsphere resonator, thereby shifting its resonant frequency so that it no longer overlaps with the signal beam frequency. Light coupling into the microsphere and onto the drop channel is thus eliminated, and the signal beam is switched from the drop channel to the throughput channel. The time constant for the WGM resonant frequency shifting was about 165 ms, indicating thermo-optic switching capabilities at speeds on the order of 100 microseconds for high-Q modes. Multiple frequencies or channels can be routed using a switch configuration with multiple microspheres and drop channels.

30 Claims, 6 Drawing Sheets

THERMO-OPTICAL SWITCH USING COATED MICROSPHERE RESONATORS

CROSS REFERENCES TO RELATED APPLICATIONS

This application claims the benefit of priority under 35 U.S.C. §119(e) from co-pending, commonly owned U.S. provisional patent application No. 60/342,866, entitled "Thermo-Optical Switches Using Coated Microsphere Resonators," filed on Oct. 25, 2001.

STATEMENT OF GOVERNMENT INTEREST

The U.S. Government has no interest in or to this patent.

FIELD OF THE INVENTION

The present invention relates to all-optical channel switching, and in particular, to an all-optical switch using coated microsphere resonators.

BACKGROUND

There is an ever-increasing demand for greater data transmission capacity in optical communications networks, i.e. for greater bandwidth. WDM (wavelength-division-multiplexing) systems provide a method for increasing the channel capacity of existing fiber optic links without physically modifying the optical fiber, by allowing multiple wavelengths to be transmitted and received over a single optical fiber. Dense WDM (DWDM) systems can be utilized to further increase information transmission capacity. DWDM systems increase the capacity of an embedded fiber by first assigning incoming optical signals to specific wavelengths within a designated wavelength band, and then multiplexing the resulting signals onto one fiber. DWDM systems combine multiple optical signals so that they can be amplified as a group, and transported over a single fiber to increase capacity. Each signal can be carried at a different rate, and in a different format. DWDM systems can multiplex and demultiplex large numbers of discrete communication channels onto a single optical fiber, and transmit these channels over long distances.

Channel routing and switching is an important function performed by DWDM network components, and allows service providers to have optical access to data at desired nodes on the network. Optical switches direct one or more wavelengths of light from an input port to an output port. All-optical switches can steer light pulses among different fiber spans without converting them into electrical signals at any point, and can therefore eliminate the need for repeated optical-electrical-optical (OEO) conversions in the network. Channel routing involves extracting and inserting of optical signals, i.e. add/drop multiplexing. For example, selected channels may be extracted or "dropped" from a multiplexed signal, and routed to desired nodes. Alternatively, extracted signals, or newly generated signals, may be inserted or "added" into the multiplexed signal.

Currently, many techniques are being developed, in the pursuit of all-optical channel switching configurations, such as switchable optical cross-connects and all-optical add-drop multiplexers. These techniques include opto-mechanical, opto-magnetic, electro-optic, acousto-optic, thermo-optic, liquid crystal, and electro-holographic devices, and bubblejet devices. Each of these techniques possess advantages and disadvantages, depending on factors such as speed, size, scalability, reliability, and integrability. None of the techniques currently under development, however, offer the potential for an optical network with increased wavelength channel density. At present, the available channel spacings (i.e. the minimum frequency separation between two different multiplexed signals) are as large as about 50 GHz.

In recent years, micro-resonators have generated significant interest for application to optical switching and channel multiplexing. In particular, optical microcavity resonators show great promise for optical communication applications such as filtering, multiplexing, and switching. Most investigations have used ring and disk-type whispering-gallery-mode (WGM) resonator fabricated from silica or silicon-based materials by chemical-vapor-deposition (CVD) and photolithographic methods. The small size of these devices (~10 um diameter) allows for mass-production efficiency and high device density. However, the methods used to prepare microrings and microdisks, combined with bending losses for such small resonators, limit the cavity quality factor (Q) of these resonators. Sidewall roughness in wafer-processed integrated-optics resonator elements is very significant due to required etching. Such resonators typically have Q-factors of $10^3$ to $10^5$ in the 1550 nm wavelength region.

Silica microsphere resonators are an especially promising type of micro-optical cavity. Silica microsphere resonators have quality factors that are several orders of magnitude better than typical surface etched resonators, because these microcavities can be shaped by natural surface tension forces during a liquid state fabrication. Silica microspheres are three-dimensional WGM resonators, typically 50–500 $\mu$m in diameter, which can be fabricated by simply melting the tip of an optical fiber. Surface tension shapes the molten silica into a near-perfect sphere before it hardens. The result is a clean, smooth silica surface with low optical loss and negligible scattering. These microcavities are inexpensive, simple to fabricate, and are compatible with integrated optics.

For these optical microcavity resonators, measured Qs as large at $10^{10}$ have been reported. The high-Q resonances encountered in these microcavities are due to optical whispering-gallery-modes (WGM) that are supported within the microcavities. The fabrication process creates an extremely smooth surface, which contributes directly to low optical WGM propagation losses. Furthermore, the spherical curvature perpendicular to the optical path in microspheres focuses the WGMs, reduces the mode volume, and thus increases the cavity Q. The total optical loss experienced in microsphere resonators is exceptionally low and Q-factors as high as $10^8$ to $10^{10}$ have been demonstrated.

Because the ultra-high Q values of microcavities are the result of energy that is tightly bound inside the cavity, optical energy must be coupled in and out of the high Q cavities, without negatively affecting the Q. The use of SPARROW waveguides for efficiently coupling light into the microcavity resonant modes is described in detail in U.S. patent application Ser. No. 09/893,954 (hereinafter the "'954 application"), entitled "Optical Microcavity Resonator System," which is commonly owned by the present assignee and which is incorporated herein by reference.

Using microsphere optical resonators coupled to SPARROW waveguides, channel spacings of approximately 100 MHz or less can be readily obtained. The high Q-factor translates directly into resonant optical linewidths of several MHz or less. This provides the potential for ultra-dense wavelength division multiplexing optical channel networks.

There is currently a need for optical switches that can be used in dense all-optical communications networks. In particular, there is a need for an improved system for performing all-optical channel switching, as part of ultra-dense wavelength division multiplexing optical communications networks having very narrow channel spacings. Because of the properties of optical microsphere resonators, described above, optical microsphere resonators have the potential to provide superior performance in numerous applications, including applications such as all-optical switches in DWDM communications systems that call for ultra-narrow linewidths.

SUMMARY OF THE INVENTION

The present invention provides an all-optical switch, using a high-Q, coated silica microsphere optical resonator onto which light is coupled using SPARROW waveguides. In particular, the present invention introduces the concept of thermo-optically switching the resonant frequencies of the high-Q microsphere, by using a secondary switching beam to heat the microcavity and shift its resonant frequency. The optical switch of the present invention can perform all-optical wavelength switching as part of ultra-dense wavelength division multiplexed optical communications networks.

An optical switch, constructed in accordance with the present invention, includes a substrate, and a first optical waveguide and a second optical waveguide disposed on the substrate. The first and second optical waveguides are SPARROWs (stripline-pedestal anti-resonant reflecting optical waveguides), which are highly reflective, multilayer dielectric stacks that include alternating high and low refractive index dielectric layers. In one embodiment, the first optical waveguide defines a throughput channel, and the second optical waveguide defines a drop channel.

At least one optical microcavity resonator, for example an optical microsphere, is constructed and arranged so as to optically interact with an input optical beam propagating through the first waveguide. The microcavity resonator is coated with a polymer layer, for example poly 2,5 (dioctyloxy-1,4-phenylenevinylene)(DOO-PPV). In one embodiment, the input optical beam is generated by a diode laser tuned to a telecommunications wavelength channel near 1.55 $\mu$m. The microcavity resonator interacts with the input beam in such a way that one or more frequency components of the beam that substantially matches a resonant mode of the microcavity are evanescently coupled onto the whispering gallery modes (WGMs) of the microcavity, and out of the microcavity onto the second optical waveguide.

Thermo-optic means are activated to produce a temperature gradient in the microcavity resonator. In one embodiment, a switching beam generated by a 405 nm diode pump laser is used to heat the microcavity resonator. As light from the pump laser is absorbed by the coated microsphere, the temperature of the microcavity resonator rises. The temperature rise causes the resonant mode of the microcavity to undergo a frequency shift, so that the resonant frequency no longer overlaps with the frequency component of the input beam that matched the resonant mode prior to the temperature rise. Resonant frequency shifts of about 3.2 GHz have been observed for small input heating powers of ~1 mW. These resonant frequency shifts are much larger than typical WGM linewidths of several MHz. Because of the frequency shift, light is no longer coupled into the microcavity and onto the second waveguide, but rather is transmitted through the first waveguide onto an output end thereof, thereby switching the input light from the drop channel (second waveguide) to the throughput channel (first waveguide). Using a test configuration, the time constant for the WGM resonant frequency shifting process was measured to be 165 ms, indicating that an optical switch constructed in accordance with the present invention can be used for thermo-optical switching at speeds on the order of 100 microseconds for high-Q modes. Switching speeds as fast as 1 $\mu$sec can be obtained using an optimized configuration consisting of a smaller microsphere and a shorter fiber stem.

In one embodiment of the invention, multiple channels can be accomodated by using a plurality of microcavity resonators, and a corresponding plurality of switching beams for heating each resonator.

A method is provided for all-optical wavelength switching in ultra-dense wavelength division multiplexed optical communications networks. The method includes coating an optical microcavity resonator with a polymer layer, and positioning the coated microcavity resonator within evanescent coupling distance of a first and a second optical waveguide. Preferably, the optical waveguides are SPARROW waveguides. The method includes directing a signal light beam onto the first optical waveguide so that a matching frequency component of the signal beam propagating through the first waveguide can be evanescently coupled onto a resonant mode of the coated microcavity resonator, and out of the microcavity onto the second waveguide. The method includes heating the coated microcavity resonator so as to shift its resonant frequency. In this way, coupling of the signal beam into the microcavity and out of the microcavity onto the second waveguide is eliminated, and the signal beam is switched from the second waveguide onto the first waveguide.

BRIEF DESCRIPTION OF THE DRAWINGS

So that the manner in which the above recited features of the present invention are attained can be understood in detail, a more particular description of the invention, briefly summarized above, may be had by reference to the embodiments thereof which are illustrated in the appended drawings. It is to be noted, however, that the appended drawings depict preferred embodiments by way of example, not by way of limitations. The drawings illustrate only typical embodiments of this invention and are therefore not to be considered limiting of its scope, for the invention may admit to other equally effective embodiments. In the drawings, like reference numerals refer to the same or similar elements.

DETAILED DESCRIPTION OF THE PREFERRED EMBODIMENTS

The present invention features a method and system for all-optical switching that involves thermo-optically switching the resonance modes of high-Q microcavity resonators. A secondary switching laser beam is used to heat a coated microsphere resonator, so that its resonant frequency is shifted. The technique of the present invention provides all-optical switching capacity at speeds up to 1 microsecond, in ultra-dense wavelength division multiplexed optical communications networks having channel spacings as narrow as 10 MHz or less.

An optical switch directs one or more wavelengths of incoming light from an input port to one or more output ports. Conventional switches switch light signals by detecting an incoming light signal, converting it to an electrical signal, and then converting the electrical signal back to a laser light signal, which is then directed to the desired output port. All-optical switches are switches that can direct optical signals from an input port to an output port of the network, without any optical/electronic conversions. Implementation of all-optical switches is therefore very desirable, and is much sought after, especially in dense optical communications networks.

Figure 1:
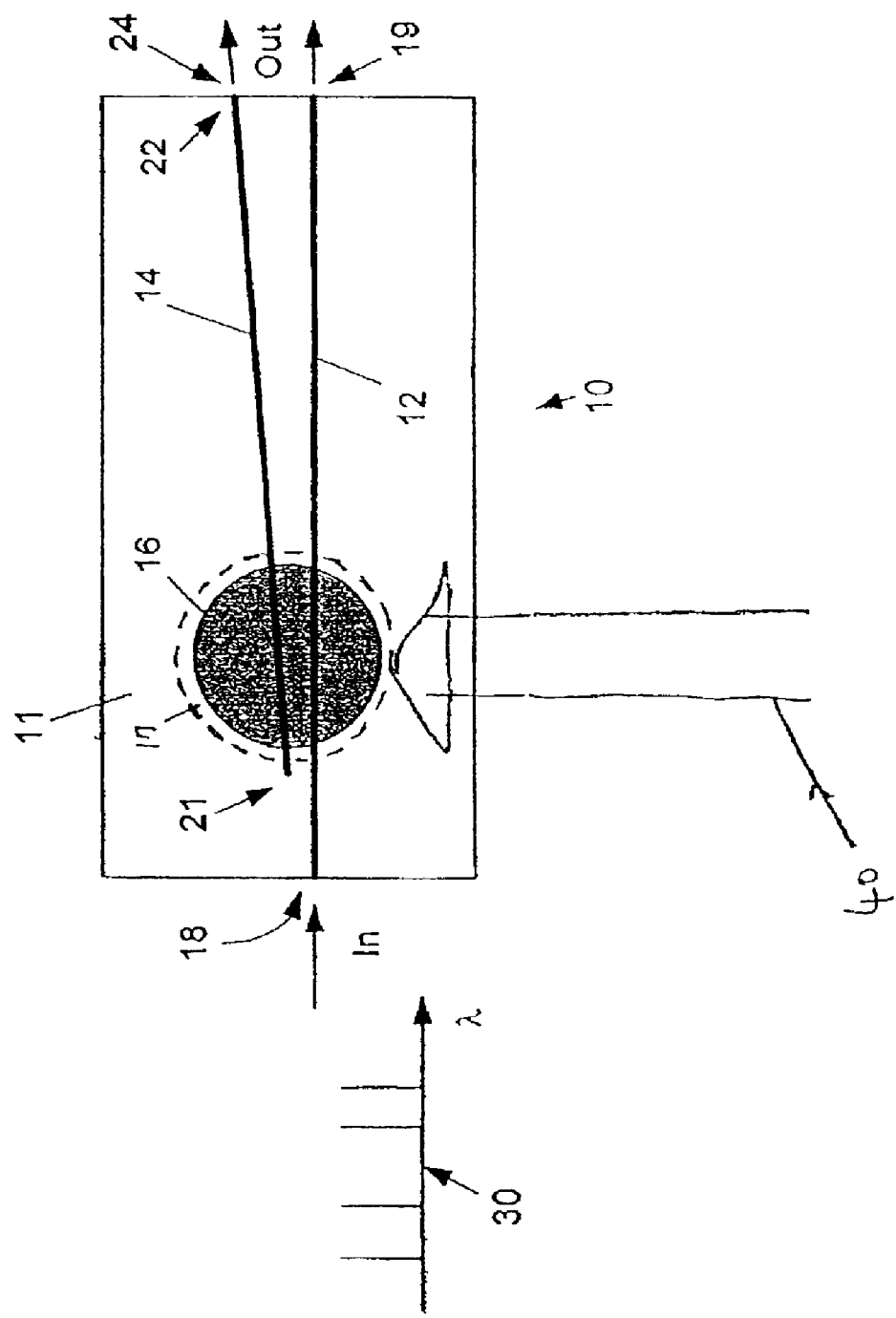
FIG. 1 is a schematic block diagram of an optical switch, constructed in accordance with one embodiment of the present invention.

FIG. 1 is a schematic block diagram of an optical switch 10, constructed in accordance with one embodiment of the present invention. The optical switch 10 includes a substrate 11, a first optical waveguide 12 and a second optical waveguide 14 disposed on the substrate, and at least one optical microcavity resonator 16. The microcavity resonator 16 is disposed above the first and second optical waveguides, within evanescent coupling distance of both waveguides. The first 12 and second 14 optical waveguides each have an input port (18 and 21, respectively) and an output port (19 and 24, respectively). An optical source (not shown) provides a signal beam 30 of input light, directed to the input port 18 of the first optical waveguide 12, which defines a throughput channel. The frequency component of the signal beam 30 that matches the resonant frequency of the microcavity 16 is evanescently coupled into the microcavity 16, and out of the microcavity 16 onto the second waveguide 14, which defines a drop channel. The matching frequency component is output from the output port 24 of the drop channel (second waveguide 14).

Thermo-optic means are provided to shift the resonant frequency of the microcavity 16, so that the output light beam is switched from the drop channel 14 to the throughput channel 12, and is directed to the output port 19 of the throughput channel 12. Preferably, the thermo-optic means is a switching light beam 40, which is generated for example by a pump laser, and which heats the microcavity 16 so that the resonant frequencies are shifted. The microcavity 16 is chemically coated with a surface layer 17, so as to enhance switching beam absorption by the microcavity 16. The substrate 11, waveguides 12 and 14, and the microcavity resonator 16 preferably form a single integrated chip. The substrate 11 is substantially planar, and is made of silicon in one embodiment of the invention. Both optical waveguides 12 and 14 are SPARROW waveguides, as described in more detail with reference to FIG. 2B.

Figure 2:
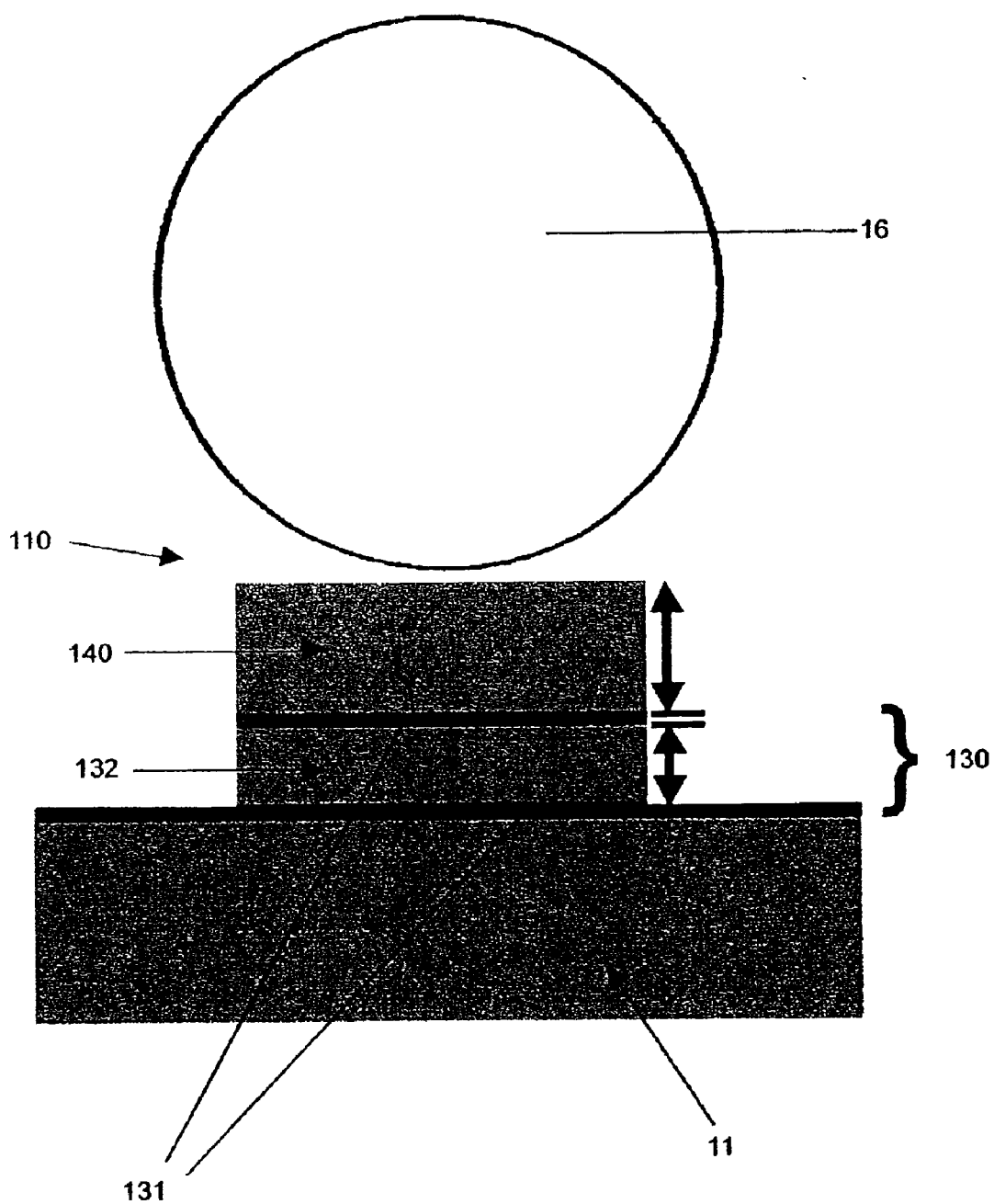
FIG. 2A illustrates an optical microcavity resonator and a SPARROW waveguide (not drawn to scale), used in an optical switch constructed in accordance with the present invention.
FIG. 2B illustrates evanescent coupling of optical radiation from a SPARROW optical waveguide onto a WGM resonance mode supported within an optical microcavity resonator.
Figure 2:
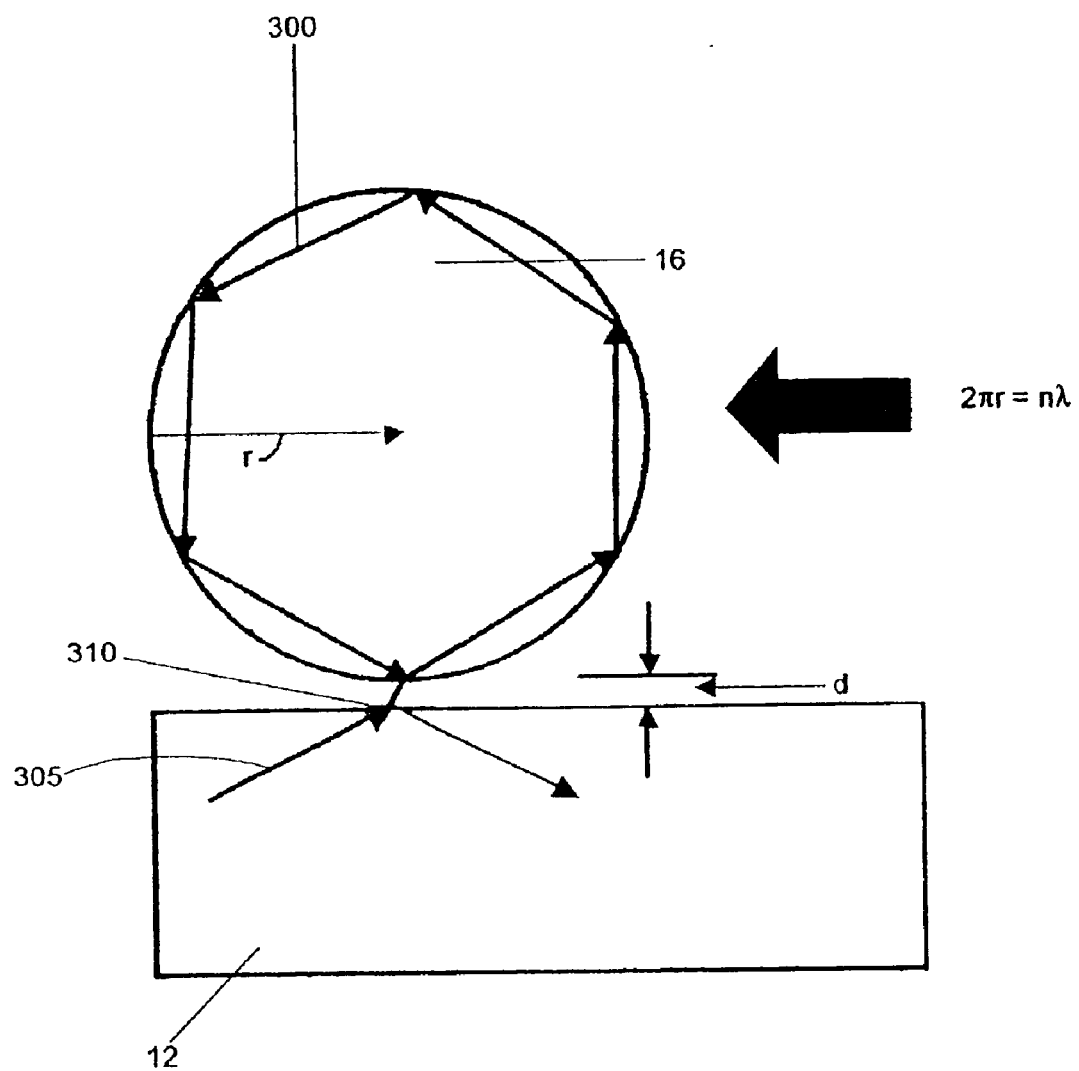

FIG. 2A illustrates an optical microcavity resonator 16 and a SPARROW waveguide 110, used in an optical switch constructed in accordance with the present invention. The optical microcavity resonator 16 is a small spherical particle, disk, or ring, having dimensions of the order of microns to millimeters. In the illustrated preferred embodiment, the microcavity resonator 16 is a microsphere, i.e. has a substantially spherical shape. The optical microcavity 16 is preferably made of silica. Silica is the material of choice for microspheres, because silica exhibits exceptionally low loss at optical communication wavelengths. In a preferred embodiment, the optical microcavity 16 is fabricated by surface tension shaping of the tip of freshly melted optical fiber. Melting of the tip of a silica wire or fiber may be accomplished through arcing in a fusion splicer, by means of a gas flame, or using a high-power laser (such as a $CO_2$ laser) to heat the glass. Microspheres, with diameters typically ranging from about 50 micrometers to about 500 micrometers, are obtained by this method.

In the illustrated embodiment, microsphere resonators were fabricated by melting the tip of a freshly-cleaved standard single-mode optical fiber (125 $\mu$m cladding diameter) in a commercial fusion splicer. The nascent microsphere was rotated during formation so as to inhibit formation of a teardrop shape. The same processing scheme can be used for multiple spheres, resulting in reproducible linewidths of less than 5 MHz. In the illustrated embodiment, the optical microcavity has a diameter of about 250 micrometers, although other sizes are also within the scope of the present invention.

The greatest impediment to the use of microsphere resonators, at present, has been the difficulty of coupling light into and out of the spheres. A coupler should have the following characteristics: efficient WGM excitation, easy alignment of the sphere and coupler, clearly defined ports, a robust and integrable structure, and a consistent fabrication process. A microsphere cannot be coupled to a conventional silica waveguide, because the guide would have to be clad with a material of significantly lower refractive index to avoid leakage into the cladding and substrate. This basic coupling scheme is frustrated since materials of index much less than silica are not readily available for CVD (chemical vapor deposition) processing. Efficient evanescent coupling has thus required fragile or large devices such as thin tapered fibers, fiber half-block couplers, angle-polished fibers, and bulk prisms that are impractical for integrated optics.

Use of a stripline pedestal antiresonant reflecting optical waveguide (SPARROW) coupler solves the problem of coupling to microspheres using a wafer-fabricated integrated-optical structure. As explained in further detail below, the SPARROW concept avoids cladding difficulties by isolating the waveguide core with a high-reflectivity dielectric stack. The optical coupling scheme utilized for the present invention is the only reported technique which provides high coupling efficiency, together with robust packaging potential.

In a preferred embodiment illustrated in FIG. 2B, the optical waveguides 12 and 14 are SPARROW waveguides. FIG. 2B illustrates a SPARROW optical waveguide 110, constructed in accordance with the present invention. The SPARROW waveguide 110 provides an efficient and robust coupling mechanism for exciting whispering-gallery-modes in an optical microcavity 16. The SPARROW waveguide 110 provides isolation of the waveguide core from the substrate using a highly reflective set of dielectric layers, thus allowing efficient, low-leakage coupling between the core mode and the resonant modes of the microcavity.

The SPARROW 110 includes a multi-layer, high-reflectivity dielectric stack 130 disposed on the substrate 11, and a waveguide core 140. The dielectric stack 130 is composed of alternating high ($n_H$) and low ($n_L$) refractive index layers 131 and 132, made of a dielectric material. As a result, the dielectric stack 130 functions as a high reflectivity dielectric mirror. The larger the number of layers 131 and 132, the higher the reflectivity of the stack 130 becomes. While the illustrated embodiment includes only one low index layer 132 disposed between two high index layers 131, the number of the layers 131 and 132 can be increased in order to increase the reflectivity of the stack 130. The alternating layers 131 and 132 forming the dielectric stack 130 provide a cladding for the SPARROW waveguide core 140, i.e. the layers forming the stack 130 may be regarded as cladding layers.

The high reflectivity of the dielectric stack 130 permits isolation of the optical modes of the microcavity 16 and the waveguide core 140 from the waveguide cladding and the substrate. By isolating the waveguide core 140 using the high-reflectivity dielectric stack 130, the SPARROW 110 circumvents the need for obtaining low refractive index cladding materials. As shown in FIG. 2A, one of the high refractive index layers 131 is in contact with the substrate 120.

In one embodiment, the high refractive index layer 131 is made of Si (silicon), while the low refractive index layer 132 is made of $SiO_2$ (silica). In one embodiment, the high refractive index $n_H$ is about 3.5, and the low refractive index $n_L$ is about 1.45, although other refractive indices are also within the scope of the present invention. The refractive indices required for efficiently guiding light within the waveguide depend on the wavelength of optical radiation. In the illustrated embodiment, the stack is composed of alternating high- and low-index layers of Si and $SiO_2$, the thickness of which are defined as a quarter of the vertically directed guide wavelength. With this configuration, more than 99% reflection can be obtained at the first interface.

The waveguide core 140 is disposed on top of the dielectric stack 130, and is in contact with another one of the high refractive index layers 131. The waveguide core 140 includes an input end 142 and an output end 144, and is adapted for transmitting optical radiation incident on the input end 142 to the output end 144. In one embodiment, the waveguide core is made of silica, and is characterized by the low refractive index $n_L$. In a SPARROW waveguide, the waveguide mode field is essentially entirely contained within the waveguide core 140 on top of the dielectric stack 130, and is isolated from the substrate 11. The successful elimination of both the microcavity mode and the waveguide mode leakage into the substrate results in extremely high coupling efficiencies. Coupling efficiencies approaching 100% have been observed. In general, the coupling efficiency of evanescent field may be from about 90% to about 99%.

FIG. 2B illustrates evanescent coupling of optical radiation from a SPARROW optical waveguide 12 onto a WGM resonance mode supported within an optical microcavity resonator 16. The optical microcavity 16 is adapted to support WGMs (whispering-gallery-modes), and is thus characterized by extremely high Q values. Light incident on an input port of the waveguide and propagating therethrough is evanescently coupled onto WGM resonances supported within the optical microcavity. An evanescent wave appears whenever a light wave undergoes total internal reflection at a dielectric interface, such as the interface between the silica waveguide and the surrounding air. The evanescent portion of the waveguide mode field is the exponentially decaying portion of the waveguide mode field, outside the relatively high index region of the waveguide. The evanescent wave decays exponentially with the distance from the surface of the waveguide core on a length scale of the order of the optical wavelength.

Evanescent coupling occurs between the waveguide and the microcavity 16 when the wavelength of the evanescent field of the waveguide mode field matches the wavelength of a resonant WGM supported within the microcavity 16. In a resonant WGM, light is trapped near the surface of the microcavity by repeated total internal reflections, and travels in a circle around the microcavity near the surface of the microcavity.

In the present invention, the distance d between the microcavity 16 and each SPARROW waveguide (the first SPARROW waveguide 12 and the second SPARROW waveguide 14, as illustrated in FIG. 1) is selected to be within the range for evanescent coupling between each waveguide and the microcavity 16, i.e. to be of the order of one wavelength of the optical mode propagating in each waveguide. With this configuration, evanescent coupling occurs between a waveguide and a microcavity when the wavelength of the evanescent field of the waveguide mode field matches the wavelength of a resonant WGM 300 supported within the microcavity 16. In resonant WGMs, light is trapped near the surface of the microcavity 16 by repeated total internal reflections, and travels in a circle around the microcavity 16 near the surface of the microcavity, as illustrated in FIG. 2B. The wavelengths of the resonant WGMs 300 are thus determined approximately by the radius r of the microcavity 16, i.e. WGM resonances occur at wavelengths given by:

$$2\pi r = n\lambda$$

When WGM resonances 300 are excited in the microcavity 16, light continues to circulate just inside the surface of the microcavity, with virtually no loss except for residual absorption and scattering in the dielectric, as shown in FIG. 2B. This is why extremely high Q-factors, up to over $10^{10}$, can be achieved in these dielectric microcavities. The Q-factor of the microcavity is a measure of the frequency selectivity of the microcavity 16. The Q is given by the time averaged stored energy per optical cycle, divided by the power coupled or scattered out of the resonator, and is limited by radiation loss. The cavity Q-factor of the microcavity can be determined by the linewidth of the resonance mode: the narrower the linewidth, the higher the cavity Q. In general, the WGM linewidth of the microcavity may be from about 1 MHz to about 1 GHz.

Figures 3A, 3B:
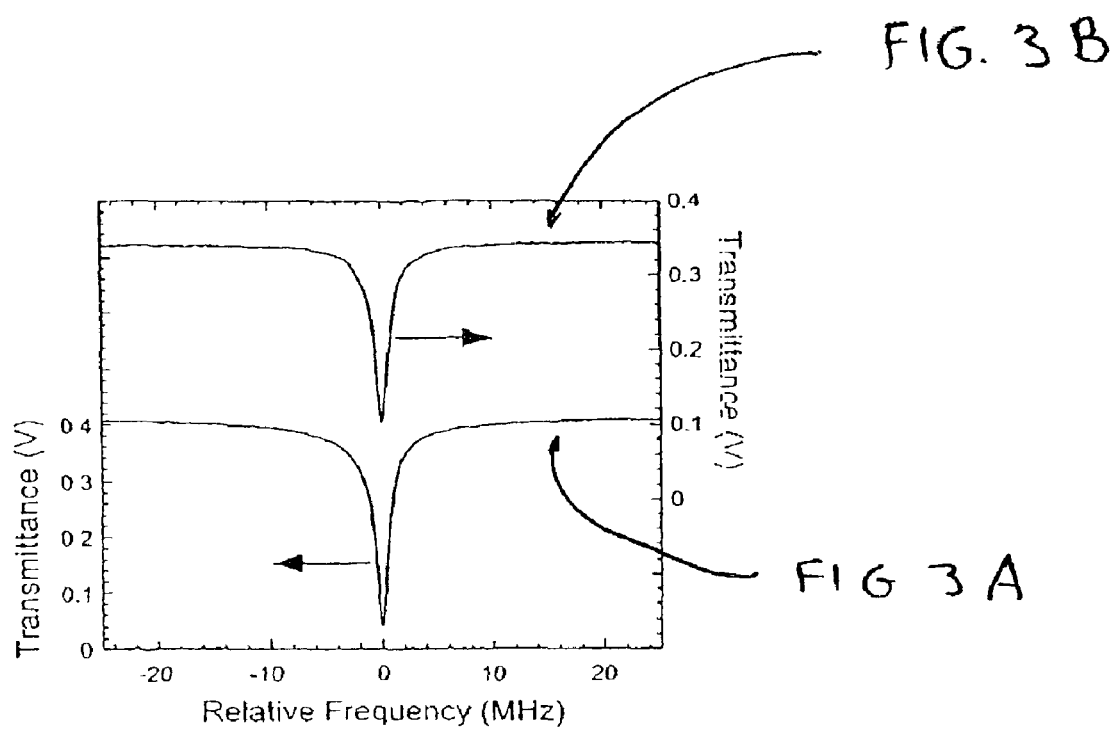
FIG. 3A illustrates the transmittance spectrum of an individual WGM for an uncoated silica microsphere.
FIG. 3B illustrates the transmittance spectrum of an individual WGM for a polymer-coated silica microsphere.

FIG. 3A illustrates the transmittance spectrum of an individual WGM for an uncoated silica microsphere. The resonance linewidth and amplitude were characterized by sweeping the signal laser frequency across a chosen microsphere resonance, and recording the data with a digitizing oscilloscope. The resulting data were converted to frequency with calibration performed using a high-finesse Fabry-Perot etalon. As seen from FIG. 3A, the uncoated WGM linewidth is 1.5 MHz, corresponding to a cavity Q of $1.3 \times 10^8$.

FIG. 3B shows a WGM resonance of a microsphere that has been coated with a layer of polymer material. Preferably, the polymer material is an optically active, conjugated polymer, including but not limited to a toluene solution of poly(2,5-dioctyloxy-1,4-phenylenevinylene), i.e. DOO-POV. While DOO-POV was used in the embodiment illustrated in FIG. 3B, other embodiments of the invention may use other polymer coatings, for example poly 3 butylthiaphene. Microspheres were coated by dipping the fiber tip into a 1 mg/ml solution of DOO-PPV in toluene. In order to make the measurement illustrated in FIG. 3B, the dip-coated microsphere was allowed to dry in ambient conditions, and the transmittance spectrum was re-measured. As seen from FIG. 3B, the WGM linewidth of the coated microsphere is 1.6 MHz, corresponding to a cavity of Q of $1.2 \times 10^8$. Thus, dip-coating does not significantly degrade the high cavity Q of the microsphere.

In the present invention, a pump-probe technique is used to effect optical switching. Referring back to FIG. 1, the optical configuration may consist of the following, in a preferred embodiment of the invention: the signal beam 30 may be generated by a narrowband, 1.55 um diode (probe) laser, and the switching (pumping) beam may be generated by a 405 nm diode (pump) laser. While in the illustrated preferred embodiment, a laser was used to generate the switching beam, other types of light sources, including but not limited to an LED (light-emittingdiode) or a lamp, may be used in other embodiments of the invention. InGaAs (indium-gallium-arsenide) photodetectors (not shown) may be used to detect output optical signals from the switch 10. High-resolution piezo-driven stages (not shown) may be used for precise sphere/waveguide positioning. Optical power coupling of the 1.55 um probe beam into a SPARROW waveguide may be performed with a fiber lens (not shown), while a microscope objective (not shown) may be used to collect light from the waveguide output port and focus it onto the photodetector.

In a preferred embodiment of the invention, the diode pump laser was used to heat the coated microsphere, at an optical power of about 1 mW. Other embodiments of the invention may use light sources characterized by different power levels, for example diode lasers characterized by optical powers of about 0.1 mW to about 100 mW. The pump laser beam is focused directly onto the surface of the microsphere, the spot size being approximately set to the microsphere diameter. As the pump light was absorbed by the coated microsphere, the temperature of the microsphere rises.

Figure 4:
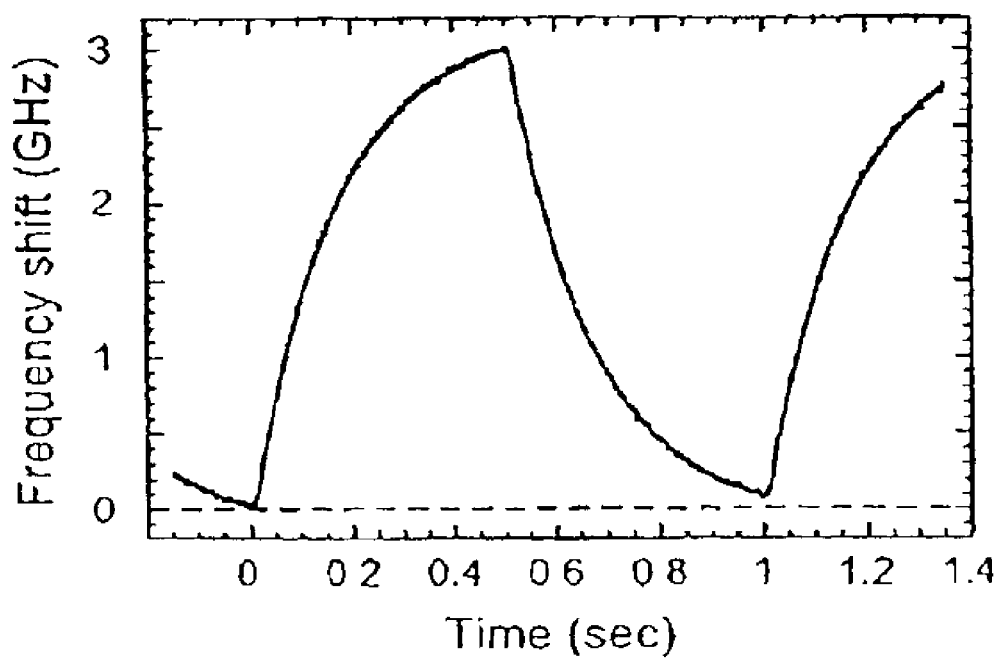
FIG. 4 shows the dynamics of the frequency shift as the pump laser is switched on (exponential increase) and off (exponential decrease).

FIG. 4 shows the dynamics of the frequency shift, resulting from heating of the microsphere by the pump laser, as the pump laser is switched on and off. The magnitude and dynamics of the frequency shift were measured by modulating the wavelength of the 1.55 um probe laser across a narrow microsphere resonance (~2 MHz). A lock-in amplifier referenced to the modulation frequency was utilized to provide phase-sensitive measurements of the resonance. The rise in temperature, and resulting frequency shift, was observed as a change in the lock-in amplifier output. The lock-in amplifier output voltage was calibrated using a high-finesse Fabry-Perot etalon. The pump laser modulation frequency was chosen so that thermo-optic transient data could be observed over several time constants. The data were collected on a digitizing oscilloscope and transferred to a computer for analysis.

The WGM resonant frequency shift of a coated microsphere was measured to be 3.2 GHz, over one thousand WGM resonant linewidths. The uncoated microsphere showed some sensitivity to the pump laser, with a 67 MHz. shift having been observed. The frequency dynamics can be fit to an exponential rise for $0 \leq t < 0.5$ sec (Eq. 1 below) and decay for $0.5 \leq t < 1$ sec (Eq. 2 below):

$$v(t) = v_0 \Delta v [1 - exp(-t/z)] \quad (1)$$

$$v(t) = v_0 + \Delta V \times v \, exp(-t/z) \quad (2)$$

where $v_o$ is the WGM frequency, $\Delta v$ is the frequency shift induced by the pump laser, and t is the time constant of the frequency shift. From the measurements illustrated in FIG. 4, the time constant of the frequency shift was calculated to be 164.57±0.06 ms, following turning on the pump laser, and 164.53±0.06 ms, following turning off the pump laser.

A shift in the WGM resonant frequency may result from excited-state absorption or thermo-optic effects. Photoexcitations of DOO-PPV exhibit excited state absorption at 1550 nm. A change in the imaginary component of the refractive index at the probe wavelength would both reduce the microsphere cavity Q, and shift the frequencies of the WGMs. The excited state lifetimes of singlet excitons in PPV have been measured to be less than 1 ns (nanosecond), while the excite state lifetimes of polarons and triplet excitons have been measured to be less than 1 ms. The excitation lifetimes are orders of magnitude too low to account for the 165 ms time constant of the frequency shift. Therefore, the frequency shifts observed in FIG. 4 can be attributed to thermo-optical effects, including enhanced pump laser absorption by the microsphere due to the polymer coating, thermal expansion of the polymer coating upon heating by the pump laser, and change of microsphere refractive index upon heating by the pump laser. WGM resonant frequency shifts due to thermal effects have been previously observed in microsphere resonators. Mode frequency shifts resulting from changes in the microsphere geometry due to applied mechanical stress have also been reported in the art.

In the present invention, the thermo-optic effect observed by pumping coated microsphere resonators is used as a switching mechanism, for example for 1×2 wavelength division multiplexing add/drop couplers. Passive wavelength-drop devices using microsphere resonators have been previously demonstrated, and is disclosed in previously filed U.S. patent application Ser. No. 09,941,308, entitled "Microcavity-Based Optical Channel Router," which is commonly owned by the present assignee and which is incorporated herein by reference.

Figure 5:
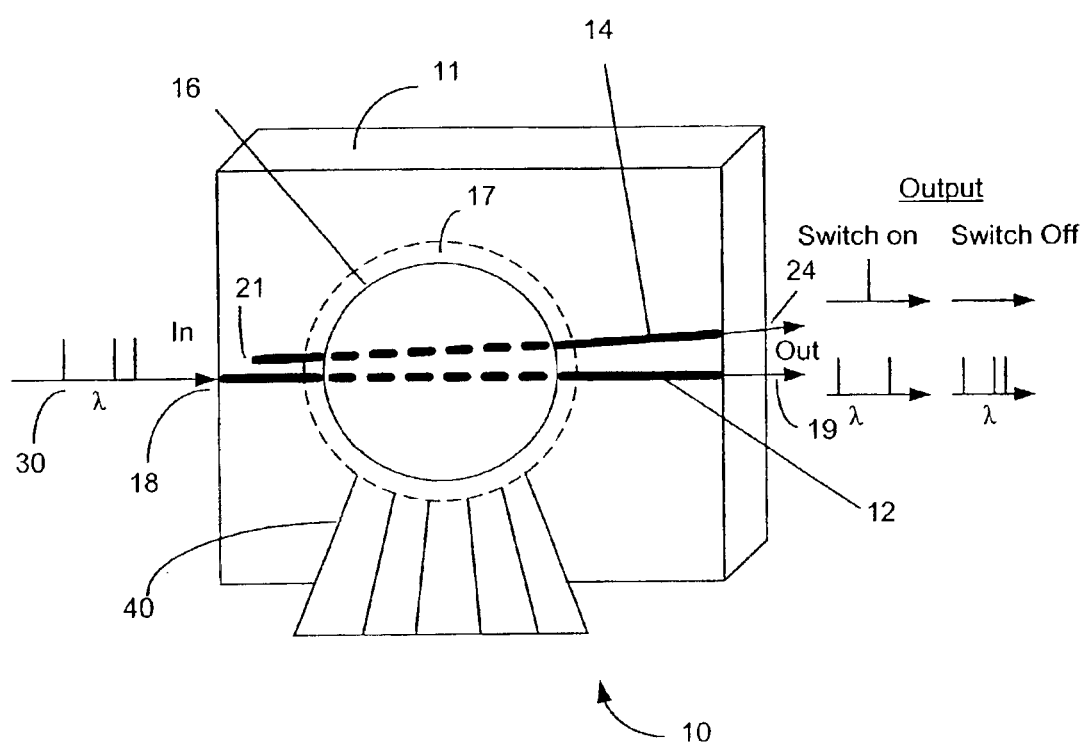
FIG. 5 shows a two-channel device configuration, using a coated microsphere resonator and a SPARROW waveguide coupler as the basis of a 1×2 all-optical switch.

FIG. 5 shows a two-channel device configuration, using a coated microsphere resonator 16 and SPARROW waveguide couplers 12 and 14 as the basis of an all-optical switch 10. Light (from the signal beam 30) entering the throughput waveguide 12 that is resonant with a microsphere WGM is coupled into the other waveguide 14, i.e. to the wavelength-drop output channel 14. The pump beam 40 is then used to shift the resonant frequency of the microsphere WGM, so that it no longer overlaps with the signal beam frequency, thus eliminating light coupling into both the microsphere 16 and the drop channel 14. This switches the signal light from the drop channel to the throughput channel. Since the switching (pump) laser beam can be transmitted via an optical fiber, no electrical power is required at the switch location, thereby providing a truly all-optical switch. Due to the small size of the microsphere, thermo-optic resonance switching can be performed using a low power pump laser beam. Sub-mW powers are sufficient, if hybrid polymer-silica microspheres are used. The switching speed and resonance shifting range can be greatly enhanced by optimizing parameters such as fiber stem length, sphere material, and the local environment, to improve heat-transfer efficiency.

In an alternative embodiment (not shown), multiple channel switching can be accomodated with a single integrated microoptical device, by utilizing a plurality of microspheres along the coupling waveguide bus. In other words, additional output channels can be created by using multiple microspheres along the input waveguide bus. In this embodiment, a plurality of optical waveguides (SPARROWs) disposed on the substrate define a plurality of drop channels. A plurality of optical microcavity resonators are constructed and arranged so as to optically interact with the throughput channel and the plurality of drop channels. A corresponding plurality of switching beams are used for pump-shifting the resonant frequencies of the plurality of microspheres. In this embodiment, the resonant frequency of each microsphere is thermo-optically tuned so as to drop a specific telecommunications network frequency.

Alternatively, microring resonators and microdisc resonators, about 10–20 μm in diameter, may be used. These resonators can be fabricated directly onto integrated optical circuits. Due to their small size, potential exists for very dense resonator arrays to be fabricated onto a single chip, thus forming a back-bone for a n×n optical cross-connect. Optical crossconnects are crossroads in an optical network, i.e. a large matrix optical switch. Their role resembles that of electronic switches such as ATM switches or IP routers, i.e. consists of forwarding signals to their destination by specific routes. Optical cross-connects and add/drop multiplexers can dynamically change a signal path to travel across a different physical route.

In summary, the present invention provides a novel all-optical switching technique using a silica microsphere optical resonator coated by a conjugated polymer. While electro-optic switches using microring resonators are under development in the art, the linewidths of these resonators are very broad (tens of GHz), and thus do not offer the potential for increased communications channel density, nor do they offer all-optical switching. Currently, WDM systems are available with 50 GHz channel spacings, where channel spacings indicate the minimum frequency separation between two different signals that are multiplexed. In the present invention, channel spacings of about 10 MHz or less can readily be obtained using microsphere optical resonators, providing the potential for very dense communications networks. Combined with the passive microsphere resonator add-drop filters, described in the commonly owned '308 application, the all-optical switch featured in the present invention can form the constituent components of ultra-dense WDM communication networks.

The technique of the present invention provides the potential for sub-millisecond all-optical switching, since the time constant (1/e) for the WGM resonant frequency shifting process was measured to be 165 ms. Since microspheres with WGM linewidths less than 2 MHz can be easily fabricated, initial measurements indicate the method and system of the present invention is capable of thermo-optically switching the WGM resonant frequency (with respect to the probe laser frequency) at speeds on the order of 100 microseconds. In general, the frequency shift may be characterized by a time constant in the range of about 1 millisecond to about 200 milliseconds. In order to increase the switching speed, system parameters such as microsphere size, microsphere material, coating thickness, and pump laser wavelength may be optimized. By optimizing one or more of these parameters, even higher switching speeds may be attained. For example, using an optimized configuration consisting of a smaller microsphere and a shorter fiber stem, switching speeds as fast as 1 μsec, and in the range of about 1 μsec to about 10 milliseconds, can be obtained.

Other potential applications utilizing thermo-optic resonance shifting of coated microsphere resonator WGMs, featured in the present invention, include environmental sensing, infrared light detection. Potential commercial applications, other than optical channel routing and switching, include remote monitoring of multi-channel, high-Q resonator-based sensing devices and components.

While the invention has been particularly shown and described with reference to specific preferred embodiments, it should be understood by those skilled in the art that various changes in form and detail may be made therein without departing from the spirit and scope of the invention. It is understood that various modifications may be made therein and that the invention or inventions may be implemented in various forms and embodiments, and that they may be applied in numerous applications, only some of which have been described herein. As used herein, the terms "includes" and "including" mean without limitation. It is intended by the following claims to claim any and all modifications and variations that fall within the true scope of the inventive concepts.

What is claimed is:

1. An optical switch, comprising:
   A. a substrate;
   B. a first optical waveguide and a second optical waveguide disposed on said substrate;
      wherein each of said first and second waveguides comprises a multi-layer dielectric stack including alternating high and low refractive index dielectric layers, and a waveguide core disposed on said dielectric stack;
   C. at least one optical microcavity resonator constructed and arranged so as to optically interact with a first optical beam propagating through said first waveguide so that a frequency component of said beam that substantially matches a resonant mode of said microcavity is coupled into said microcavity and out of said microcavity onto said second optical waveguide; and
   D. thermo-optic means for producing a temperature gradient in said microcavity resonator so as to cause said resonant mode of said microcavity to undergo a frequency shift, whereby said frequency component of said optical radiation is prevented from coupling into said microcavity, and is transmitted through said first waveguide onto an output end thereof.

2. An optical switch according to claim 1, wherein said thermo-optic means comprises a second optical beam for heating said microcavity.

3. An optical switch according to claim 2, further comprising a light source for generating said second light beam.

4. An optical switch according to claim 3, wherein said light source is selected from the group consisting of a laser, an LED (light-emitting-diode), or a lamp.

5. An optical switch according to claim 3, wherein said light source is a diode laser characterized by an optical power of about 0.1 mW to about 100 mW.

6. An optical switch according to claim 1, wherein said high index dielectric layer comprises silicon.

7. An optical switch according to claim 1, wherein said low index dielectric layer and said waveguide core comprises silica.

8. An optical switch according to claim 1, wherein said dielectric stack is characterized by a reflectivity sufficient to isolate the optical modes within said microcavity resonator from said substrate.

9. An optical switch according to claim 1, wherein said dielectric stack is characterized by a reflectivity sufficient to isolate the optical modes within said waveguide core from said substrate.

10. An optical switch according to claim 1, wherein the outer surface of said optical microcavity resonator is coated with a layer of conjugated polymer material.

11. An optical switch according to claim 1, wherein said polymer material comprises at least one of DOO-PPV (poly (2,5-dioctytoxy-1,4-phenylenevinylene)) and poly 3 butylthiaphene.

12. An optical switch according to claim 1, wherein said optical microcavity is disposed at a distance from each optical waveguide that is sufficiently small so as to allow evanescent coupling between each optical waveguide and said optical microcavity.

13. An optical switch according to claim 12, wherein said distance is less than one wavelength of said optical radiation.

14. An optical switch according to claim 12, wherein the coupling efficiency of said evanescent field is from about 90% to about 99%.

15. An optical switch according to claim 1, wherein said one or more resonant modes of said optical microcavity resonator comprises a whispering gallery mode (WGM).

16. An optical switch according to claim 15, wherein said optical microcavity resonator is characterized by a WGM linewidth of about 1 MHz to about 1 GHz.

17. An optical switch according to claim 15, wherein said optical microcavity has a substantially spherical shape, and wherein the wavelengths of the whispering gallery modes of said microcavity is related to the radius r of said substantially spherical microcavity according to the formula:

$$2\pi r = n\lambda,$$

and n is a nonzero integer.

18. An optical switch according to claim 1, wherein said optical microcavity is made of silica.

19. An optical switch according to claim 1, wherein said first and second waveguides form an integrated optical chip.

20. An optical switch according to claim 1, wherein said frequency shift is about 3.2 GHz. An optical switch according to claim 1, wherein said optical microcavity resonator is characterized by a quality factor (Q) from about $10^5$ to about $10^{10}$.

21. An optical switch according to claim 1, further comprising a light source for generating said first light beam.

22. An optical switch according to claim 21, wherein said light source is a laser.

23. An optical switch according to claim 22, wherein said laser is a narrowband external-cavity diode laser at 1.55 $\mu$m.

24. An optical switch according to claim 1, wherein said optical microcavity is selected from the group consisting of microspheres, microdisks, and microrings.

25. An optical switch according to claim 1, wherein said optical microcavity is characterized by a substantially spherical configuration.

26. An optical switch according to claim 1, wherein said optical microcavity is characterized by a diameter of about 50 microns to about 500 microns.

27. An optical switch according to claim 1, further comprising a detector for detecting output optical radiation from an output end of said first and said second waveguides. An optical switch according to claim 1, wherein said frequency shift is characterized by a time constant of about 1 milliseconds to 200 milliseconds.

28. An optical switch according to claim 1, wherein said frequency shift is characterized by a time constant of about 1 microsecond to about 10 milliseconds.

29. An optical switch according to claim 1, wherein said optical microcavity resonator is fabricated using a hybrid polymer-silica material.

30. An optical switch comprising:
  A. a substrate;
  B. a first optical waveguide disposed on said substrate and defining a throughput channel;
  C. a second optical waveguide disposed on said substrate and defining a drop channel;
    wherein each of said first and second waveguides comprises a multi-layer dielectric stack including alternating high and low refractive index dielectric layers, and a waveguide core disposed on said dielectric stack;
  D. at least one optical microcavity resonator constructed and arranged so as to optically interact with said throughput channel and said drop channel so that a frequency component of a light beam incident upon an input end of said throughput channel that substantially matches a resonant mode of said microcavity is coupled into said microcavity and out of said microcavity onto said drop channel;
  wherein said optical microcavity resonator includes an outer surface coated with a polymer layer;
  E. thermo-optic means for producing a temperature gradient in said microcavity resonator;
  wherein upon activation of said thermo-optic means, said resonant mode of said microcavity undergoes a frequency shift, thereby preventing said frequency component of said light beam from coupling into said microcavity and onto said drop channel.

* * * * *